United States Patent
Schwan et al.

(10) Patent No.: US 7,607,718 B2
(45) Date of Patent: Oct. 27, 2009

(54) REAR WING DEVICE

(75) Inventors: Norbert Schwan, Rutesheim (DE); Ralf Habrik, Pfedelbach-Untersteinbach (DE); Axel Hoh, Neunkirchen (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 0 days.

(21) Appl. No.: 12/359,361

(22) Filed: Jan. 26, 2009

(65) Prior Publication Data

US 2009/0195016 A1    Aug. 6, 2009

(30) Foreign Application Priority Data

Jan. 25, 2008    (DE) ................ 10 2008 006 007

(51) Int. Cl.
   *B60J 7/00*    (2006.01)
(52) U.S. Cl. .................................. 296/180.5
(58) Field of Classification Search .............. 296/180.1, 296/180.3, 180.5
   See application file for complete search history.

(56) References Cited

U.S. PATENT DOCUMENTS 6,338,524 B1 *  1/2002  Wu ...................... 296/180.1
7,063,375 B2     6/2006  Dringenberg et al.

FOREIGN PATENT DOCUMENTS

| DE | 31 36 937 A1 | 3/1983 |
| DE | 200 03 565 U1 | 4/2000 |
| DE | 200 09 988 U1 | 9/2000 |
| DE | 100 47 010 C2 | 4/2002 |
| GB | 2 021 059 A | 11/1979 |
| GB | 2 106 060 A | 4/1983 |

\* cited by examiner

*Primary Examiner*—Joseph D Pape

(57) ABSTRACT

A rear wing device for a motor vehicle has a wing body which extends transversely with respect to a longitudinal direction of the vehicle and horizontally and is disposed laterally between two side parts extending parallel to the longitudinal direction and vertically. The wing body is fastened to each side part by a retaining device, wherein the retaining devices permit adjustment of an angle of attack of a profile of the wing body in relation to a horizontal orientation. The adjustability of the wing body can be improved in that each retaining device has a guide body which can be adjusted by an adjusting screw along the adjusting screw and is coupled via a first guide pin to a wing support to which the wing body is attached. The wing support can be adjusted in a manner guided by a second guide pin and a third guide pin in slideways.

10 Claims, 3 Drawing Sheets

REAR WING DEVICE

CROSS REFERENCE TO RELATED APPLICATION

This application claims the priority, under 35 U.S.C. § 119, of German application DE 10 2008 006 007.0, filed Jan. 25, 2008; the prior application is herewith incorporated by reference in its entirety.

BACKGROUND OF THE INVENTION

Field of the Invention

The invention relates to a rear wing device for a motor vehicle, in particular for a sports vehicle. The invention also relates to a motor vehicle equipped with a rear wing device of this type.

A rear wing device of this type is known, for example, from German utility model DE 200 03 565 U1 and contains a wing body which extends transversely with respect to a longitudinal direction of the vehicle and horizontally and is arranged laterally between two side parts extending parallel to the longitudinal direction and vertically. Furthermore, the wing body is fastened to each side part by a retaining device. In this case, the retaining devices are configured in such a manner that they permit an adjustment of an angle of attack of a profile of the wing body in relation to a horizontal orientation.

In the case of the known rear wing device, each retaining device has a circular disk to which the wing body is fastened on one side and which is arranged on the other side in a rotationally adjustable manner in a complementary receptacle on the respective side part and can be screwed in different relative positions to the side part by a pattern of holes.

A further rear wing device of this type is known from published, British patent GB 2 021 059 A. The retaining devices of the rear wing device each contain two screwing points which are spaced apart from each other and of which the one defines an axis of rotation for the wing body and of which the other can be adjusted in an opening in the shape of a circular arc in the respective side part when the respective screw connections are loosened.

Further rear wing devices are known from German patent DE 100 47 010 C2, from U.S. Pat. No. 7,063,375 B2, from German utility model DE 200 09 988 U1 and from published, non-prosecuted German patent application DE 31 36 937 A1.

SUMMARY OF THE INVENTION

It is accordingly an object of the invention to provide a rear wing device that overcomes the above-mentioned disadvantages of the prior art devices of this general type. The embodiment being distinguished in particular in that, first, precise adjustment of the angle of attack is possible, with it being possible, second, for relatively large forces to be transmitted via the retaining device.

With the foregoing and other objects in view there is provided, in accordance with the invention, a rear wing device for a motor vehicle having a longitudinal direction. The rear wing device contains two side parts extending parallel to the longitudinal direction and vertically, retaining devices, and a wing body extending transversely with respect to the longitudinal direction of the motor vehicle and horizontally and disposed laterally between the two side parts. The wing body is fastened to each of the side parts by one of the retaining devices. The retaining devices permit adjustment of an angle of attack of a profile of the wing body in relation to a horizontal orientation. First guide pins, second guide pins, and third guide pins are provided. Wing supports are attached to the wing body. Each of the retaining devices has an adjusting screw and a guide body being adjusted by the adjusting screw along the adjusting screw and is coupled via one of the first guide pins to one of the wing supports. Each of the retaining devices has slideways configured in a fixed position relative to a respective one of the side parts. The wing supports are adjusted in a manner guided by one of the second guide pins and one of the third guide pins in the slideways.

The invention is based on the general concept of equipping each of the retaining devices with a type of gear mechanism via which the wing body is attached to the respective side part. On the input side, the respective gear mechanism has an adjusting screw via which adjusting forces for adjusting the angle of attack can be introduced. In this case, the adjusting screw drives a guide body axially, i.e. in its longitudinal direction. On the output side, the gear mechanism has a wing support to which the respective end of the wing body is attached. The wing support is first coupled in terms of drive to the guide body via a first guide pin and is second secured adjustably on the respective side part in a manner guided in slideways via a second guide pin and a third guide pin. In this case, the slideways are coordinated with the guide body in such a manner that a linear adjustment of the guide body along the adjusting screw leads to a defined pivoting adjustment of the wing support and therefore of the wing body. Since, in this construction, the wing support is always supported on the respective side part via three guide pins, the respective retaining device can transmit comparatively large forces between the guide body and the side part. Furthermore, the adjustment of the angle of attack can be carried out comparatively precisely by the spindle drive which is realized with the aid of the adjusting screw.

According to one advantageous embodiment, in the respective retaining device the guide body can be disposed in a guide slot and can be adjusted in a guided manner therein by the adjusting screw. By the adjustability of the guide body in a guided manner, play within the gear mechanism can be reduced. The transmission of force can be improved without the adjusting screw being loaded to a greater extent. In addition, the accuracy of the adjusting operation can be increased further.

In another advantageous embodiment, the respective side part can have an insert which contains the respective retaining device and which can be inserted into a cutout formed on the remaining side part. In this embodiment, the retaining devices together with the respective insert form a unit which can be completely preassembled and which can in principle be fitted to differently configured side parts. In particular, in the case of this embodiment, vehicles can be retrospectively equipped with retaining devices of this type by corresponding receptacles for the inserts being formed on the side parts.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a rear wing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
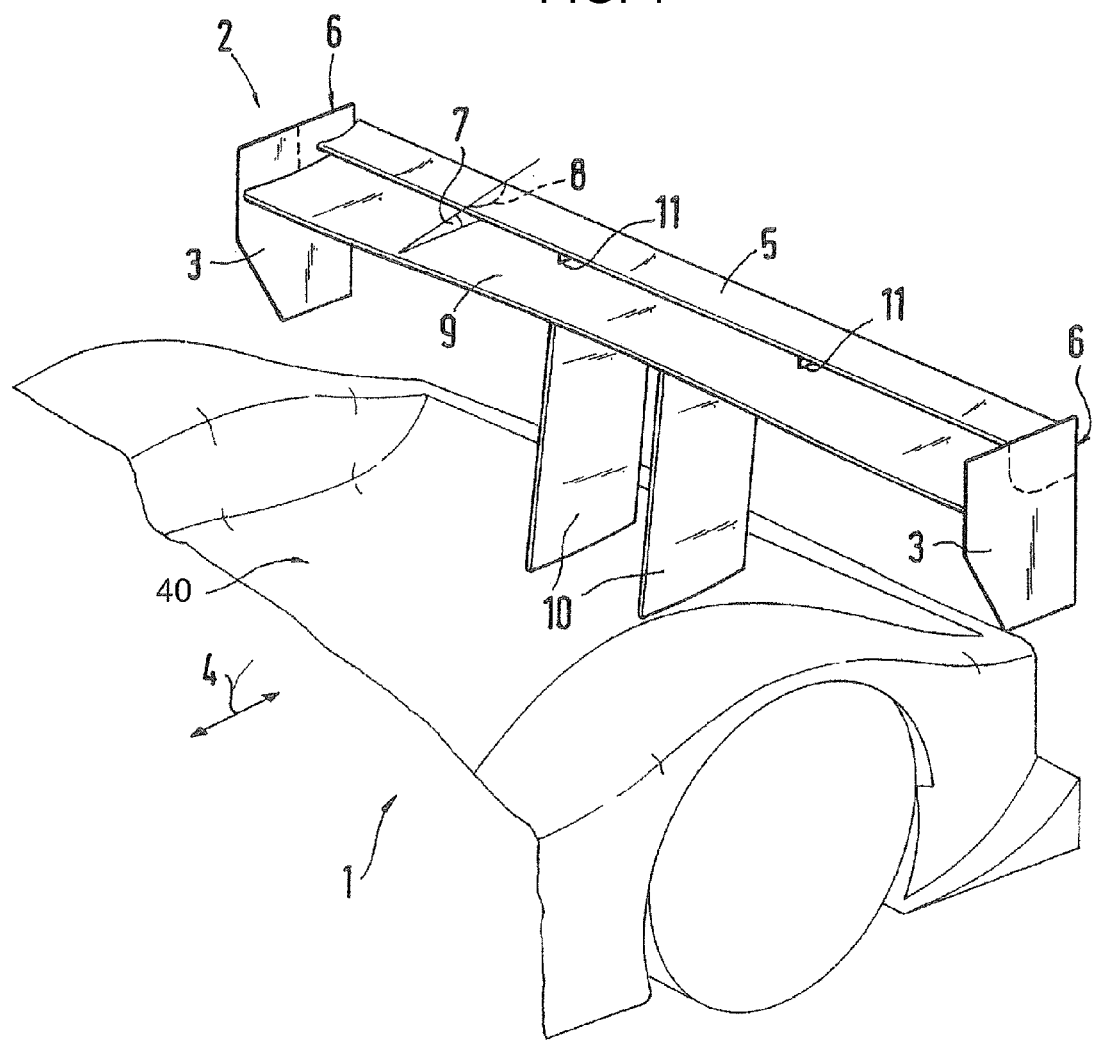
FIG. 1 is a diagrammatic, perspective view of a motor vehicle in a region of a rear of the vehicle according to the invention.

Referring now to the figures of the drawing in detail and first, particularly, to FIG. 1 thereof, there is shown a motor vehicle 1 (only partially illustrated), which is preferably a sports vehicle, and has a rear wing device 2 in the rear region illustrated. During operation of the vehicle 1, the rear wing device 2 serves to improve the road grip of the vehicle 1 in the rear region.

The rear wing device 2 has two side parts 3 which extend parallel to a longitudinal direction 4 of the vehicle 1, which direction is indicated by a double arrow, and also vertically. Furthermore, the rear wing device 2 has a wing body 5 which extends transversely with respect to the longitudinal direction 4 of the vehicle and horizontally and which is fastened on each side to the respective side part 3 via a retaining device 6. In this case, the retaining devices 6 are configured in such a manner that they make it possible to adjust an angle of attack 7 of a profile 8 of the wing body 5 in relation to a horizontal orientation. The angle of attack 7 determines the dynamic action of the flow of the respective wing body 5.

In the example shown, the rear wing device 2 has two wing bodies, namely, first a main wing 9 and, second, a secondary wing which is formed by the wing body 5 and is disposed on an end region on the outflow side of the main wing 9. The main wing 9 is fastened to a body 40 of the vehicle 1 via at least one support 10. In the example, two such supports 10 are provided, the supports each extending parallel to the longitudinal direction 4 of the vehicle and also vertically. The side parts 3 are fastened to the lateral ends of the main wing 4. Accordingly, the secondary wing 5 or the wing body 5 is fastened to the main wing 9 via the side parts 3.

Furthermore, the wing body 5 can be supported vertically on the main wing 9 via at least one supporting element 11. In the example, two such supporting elements 11 are provided.

Figure 2:
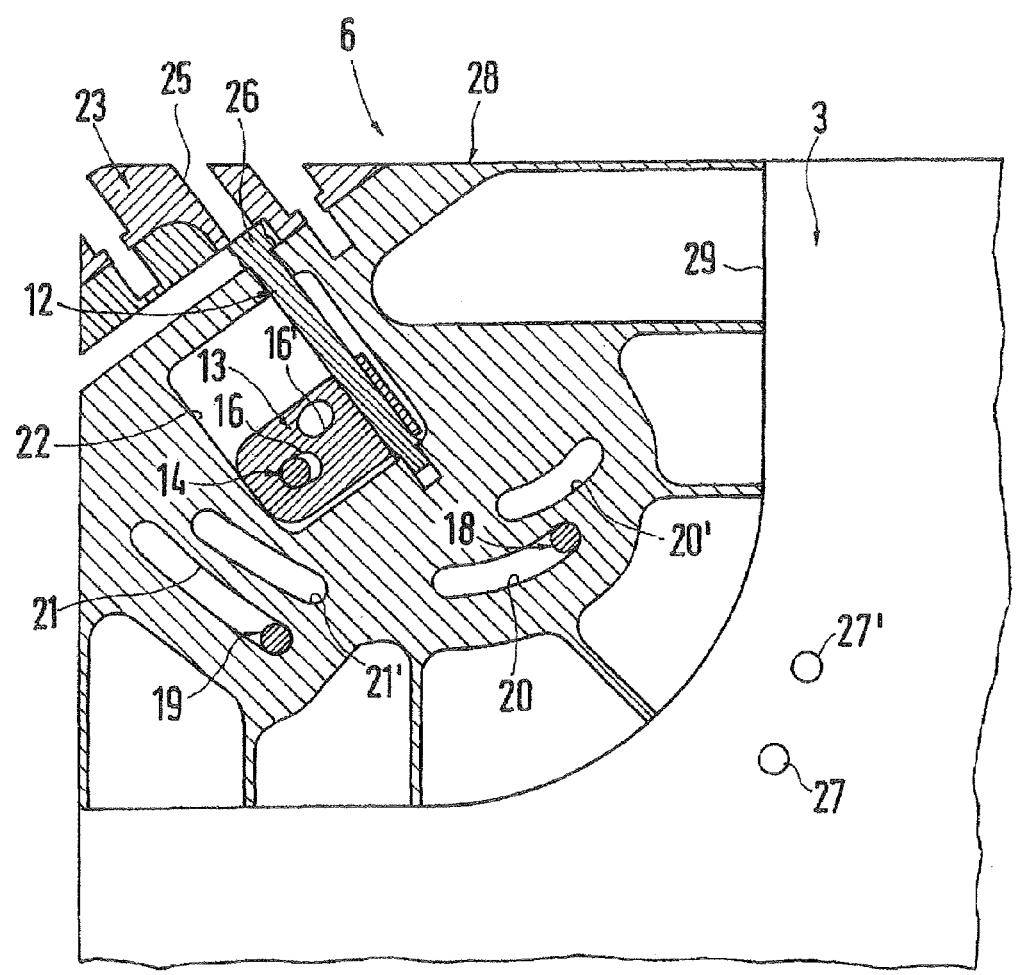
FIG. 2 is a diagrammatic, longitudinal section view through a side part in a region of a retaining device.
Figure 3:
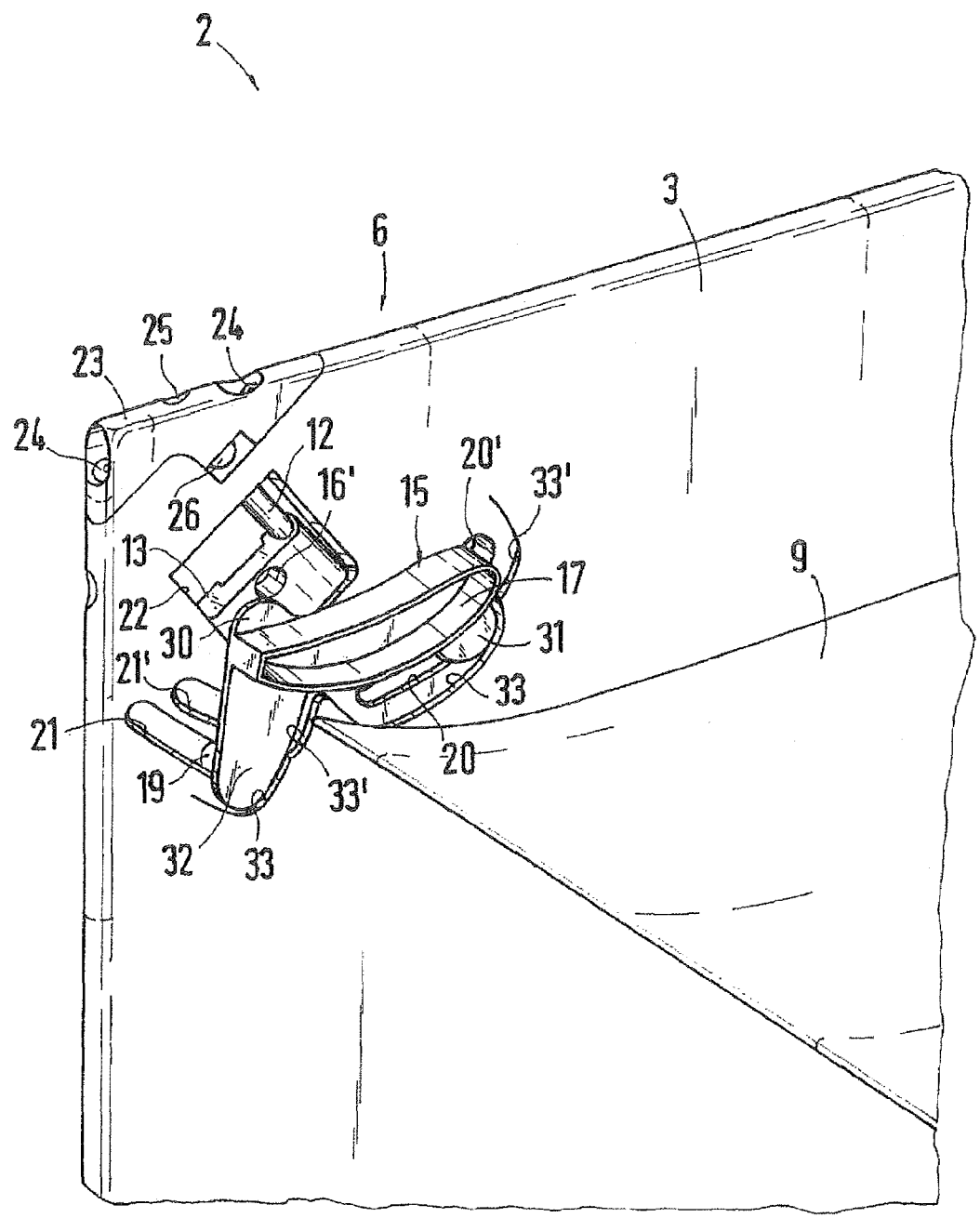
FIG. 3 is a diagrammatic, perspective view from the inside of a side part in the region of the retaining device.

According to FIGS. 2 and 3, each retaining device 6 has an adjusting screw 12 and a guide body 13. The adjusting screw 12 is mounted rotatably and has an external thread. The guide body 13 has an internal thread which is complementary to the external thread of the adjusting screw 12 and into which the adjusting screw 12 is inserted. The guide body 13 can be adjusted along the adjusting screw 12 by rotation of the adjusting screw 12. The guide body 13 is coupled in terms of drive to a wing support 15, which can be seen in FIG. 3, via a first guide pin 14, which can be seen in FIG. 2. For this purpose, the first guide pin 14 is inserted into a pin receptacle 16 which is formed on the guide body 13. The wing support 15 is configured in such a manner that the wing body 5 can be attached thereto. For example, the wing body 5 can be inserted into a receptacle 17 which is configured in a complementary manner to the profile 8 of the wing body 5 and is formed on the wing support 15.

The wing support 15 can now be adjusted for its part in a manner guided via two further guide pins, which can be seen in FIG. 2, namely via a second guide pin 18 and a third guide pin 19, in corresponding slideways 20 and 21. The slideways 20, 21 are configured here such that they are fixed in position relative to the respective side part 3.

By rotation of the adjusting screw 12, the guide body 13 is adjusted along the adjusting screw 12 and, as a result, inevitably carries along the first guide pin 14. This forces an adjusting movement of wing support 15, in which movement the latter is pivoted by its second guide pin 18 along the first slideway 20 and by its third guide pin 19 along the second slideway 21. This pivoting of the wing support 15 changes the angle of attack 7 of the wing profile 8.

In the example shown, the guide body 13 is arranged adjustably in a guide slot 22 with which the guide body 13 interacts in such a manner that an actuation of the adjusting screw 12 causes a guided longitudinal adjustment of the guide body 13 along the guide slot 22. By the guide slot 22, a gear mechanism, which is formed by the adjusting screw 12, the guide body 13 and the wing support 15, obtains additional stability, which first improves a transmission of force between the wing body 5 and the respective side part 3 and second permits increased precision for the adjustment of the angle of attack 7.

The retaining device 6 can optionally be equipped with a cover 23 which is of a removable configuration and with the aid of which the adjusting screw 12 can be covered and can optionally also be secured. According to FIG. 3, the cover 23 can be fastened to the rest of the retaining device 6, for example with the aid of two screws 24. In this embodiment, the cover 23 contains a passage opening 25 through which a head 26 of the adjusting screw 12 is axially accessible such that the adjusting screw 12 can be actuated for rotation even when the cover 23 is fitted.

According to FIG. 2, the pin receptacle 16 which is provided on the guide body 13 for the first guide pin 14 is configured as an elongated hole. This is advantageous for the kinematics of the adjusting operation.

According to FIGS. 2 and 3, the guide body 13, in a preferred embodiment, can have two separate pin receptacles for the first guide pin 14, namely the pin receptacle 16 which, in the configuration shown, receives the first guide pin 16, and a further pin receptacle 16' which is separate to it. The first guide pin 16 can be inserted into either of the two pin receptacles 16, 16'. In the preferred embodiment shown here, a further slideway 20' is also provided in a corresponding manner for the second pin 18, in which slideway the second guide pin 18 can be alternatively adjusted in a guided manner. A further slideway 21' is also provided for the third guide pin 19, in which slideway the third guide pin 19 can alternatively be adjusted in a guided manner. Different basic positions can be predetermined for the respective wing support 15 and therefore for the respective wing body 5 by the alternatively provided slideways 20', 21' and the alternatively available pin receptacle 16'. The basic positions essentially differ by the vertical distance of the wing body 5, i.e. of the secondary wing, from the main wing 9. In a corresponding manner, two different fastening openings 27 and 27' can also be provided for the main wing 9 on the respective side part 3, the fastening openings being alternatively used in order to realize different basic positions for the main wing 9.

According to FIG. 2, the respective side part 3 can have an insert 28 which is inserted into a cutout 29 formed on the other side part 3. The respective insert 28 has the retaining device 6.

In particular, the insert 28 contains the slideways 20, 21 and 20', 21' and/or the guide slot 22. In a different embodiment, the retaining device 6 may also be incorporated directly into the side part 3. The slideways 20, 21 and 20', 21' and/or the guide slot 22 can then be incorporated directly into the respective side part 3.

The guide pins 14, 18, 19 are formed on corresponding arms on the respective wing support 15. According to FIG. 3, the first guide pin 14 is formed on a first arm 30 while the second guide pin 18 is formed on a second arm 31 and the third guide pin 19 is formed on a third arm 32. The respective side part 3 or the associated insert 28 can optionally have cutouts 33 or 33' which are configured in a complementary manner to the paths of movement of the arms 31, 32 which arise during adjusting movements of the wing support 15.

The invention claimed is:

1. A rear wing device for a motor vehicle having a longitudinal direction, the rear wing device comprising:
    two side parts extending parallel to the longitudinal direction and vertically;
    retaining devices;
    a wing body extending transversely with respect to the longitudinal direction of the motor vehicle and horizontally and disposed laterally between said two side parts, said wing body fastened to each of said side parts by one of said retaining devices, said retaining devices permitting adjustment of an angle of attack of a profile of said wing body in relation to a horizontal orientation;
    first guide pins;
    second guide pins;
    third guide pins;
    wing supports attaching to said wing body;
    each of said retaining devices having an adjusting screw and a guide body being adjusted by said adjusting screw along said adjusting screw and is coupled via one of said first guide pins to one of said wing supports, each of said retaining devices having slideways formed therein and configured in a fixed position relative to a respective one of said side parts; and
    said wing supports being adjusted in a manner guided by one of said second guide pins and one of said third guide pins in said slideways.

2. The rear wing device according to claim 1, wherein each of said retaining devices has a guide slot formed therein and said guide body is disposed in said guide slot and can be adjusted therein in a manner guided by means of said adjusting screw.

3. The rear wing device according to claim 1, wherein each of said retaining devices has a removable covering for at least one of covering and securing said adjusting screw.

4. The rear wing device according to claim 1, wherein said guide body has a pin receptacle formed therein and configured as an elongated hole for receiving one of said first guide pins.

5. The rear wing device according to claim 1, wherein said guide body has two separate pin receptacles formed therein in either of which one of said first guide pins can be received.

6. The rear wing device according to claim 1, wherein for each of said second guide pins and said third guide pins, two separate ones of said slideways are provided in each case, and said second guide pin and said third guide pin can be adjusted in either of said slideways in a guided manner.

7. The rear wing device according to claim 1, wherein:
    each of said side parts has a cutout formed therein; and
    each of said side parts has an insert containing a respective one of said retaining devices and are inserted into respective said cutout formed on the other one of said side parts.

8. The rear wing device according to claim 1, further comprising a main wing and a secondary wing formed by said wing body.

9. The rear wing device according to claim 8, further comprising at least one support, said main wing being fastened to a body of the motor vehicle via said at least one support, and said side parts are fastened to said main wing.

10. A vehicle, comprising:
    a longitudinal direction; and
    a rear wing device containing:
        two side parts extending parallel to said longitudinal direction and vertically;
        retaining devices;
        a wing body extending transversely with respect to said longitudinal direction of the motor vehicle and horizontally and disposed laterally between said two side parts, said wing body fastened to each of said side parts by one of said retaining devices, said retaining devices permitting adjustment of an angle of attack of a profile of said wing body in relation to a horizontal orientation;
        first guide pins;
        second guide pins;
        third guide pins;
        wing supports attaching to said wing body;
        each of said retaining devices having an adjusting screw and a guide body being adjusted by said adjusting screw along said adjusting screw and is coupled via one of said first guide pins to one of said wing supports, each of said retaining devices having slideways formed therein and configured in a fixed position relative to a respective one of said side parts; and
        said wing supports being adjusted in a manner guided by one of said second guide pins and one of said third guide pins in said sideways.

* * * * *